Nov. 13, 1956    L. G. SIMJIAN    2,770,719
PHOTOGRAPHIC SYSTEM
Filed April 2, 1954

LUTHER G. SIMJIAN
INVENTOR

BY Ralph E. Bitner
ATTORNEY

United States Patent Office

2,770,719
Patented Nov. 13, 1956

2,770,719

PHOTOGRAPHIC SYSTEM

Luther G. Simjian, Greenwich, Conn., assignor to The Reflectone Corporation, Stamford, Conn., a corporation of Connecticut Application April 2, 1954, Serial No. 420,600

6 Claims. (Cl. 250—59)

This invention relates to a photographic system for locating hidden objects within a body which is opaque to visible light. It has particular reference to the arrangement of two sources of penetrating radiation and two photographic films which produce two photographic images and enable an operator to locate an embedded object with great accuracy.

In the description that follows the source of penetrating radiation is an X-ray tube since such a source is generally more convenient and more adaptable for the exploration of bodies which are opaque to visible light. It is to be understood, however, that other sources of penetrating radiation may be employed instead of the X-ray tubes, radium and other radioactive materials give off penetrating radiation which affects a photographic film and therefore these substances may be substituted for the X-ray sources.

In the past it has been customary to make a single photograph of a body in one position, then turn the body approximately ninety degrees and make a second photograph. The examination of the two resulting photographic images gives an operator the approximate location of a hidden object which has a density differing from the average density of the body. Such a determination is not satisfactory because there may be relative motion between the body components during the time interval between pictures. Also, since the penetrating radiation comprises rays which are divergent from a point source instead of being parallel, a relative position of a hidden object produces different results depending upon its position relative to the photographic film.

The present invention employs two sources of penetrating radiation and two photographic films, both sources being activated at the same time and both photographic films being exposed at the same time. The result is two pictures which may be combined to show the exact position of a hidden object.

One of the objects of this invention is to provide an improved photographic system which avoids one or more of the disadvantages and limitations of prior art arrangements.

Another object of the invention is to enable an operator to take simultaneous photographs by means of penetrating radiation of an opaque body and to determine with a high degree of accuracy the position of hidden objects.

Another object of the invention is to shorten the time of exposure during the process of locating hidden objects.

Another object of the invention is to provide an operator with a detailed mechanical system of interpreting two photographic images so that hidden objects may be located.

The invention includes a photographic system which comprises two sources of penetrating radiation positioned on opposite sides of the body being investigated. Two photographic films are also positioned on opposite sides of the body in close proximity thereto. The sources and films are arranged so that each film receives penetrating radiation from only one source.

For a better understanding of the present invention, together with other and further objects thereof, reference is made to the following description taken in connection with the accompanying drawings.

Figure 1:
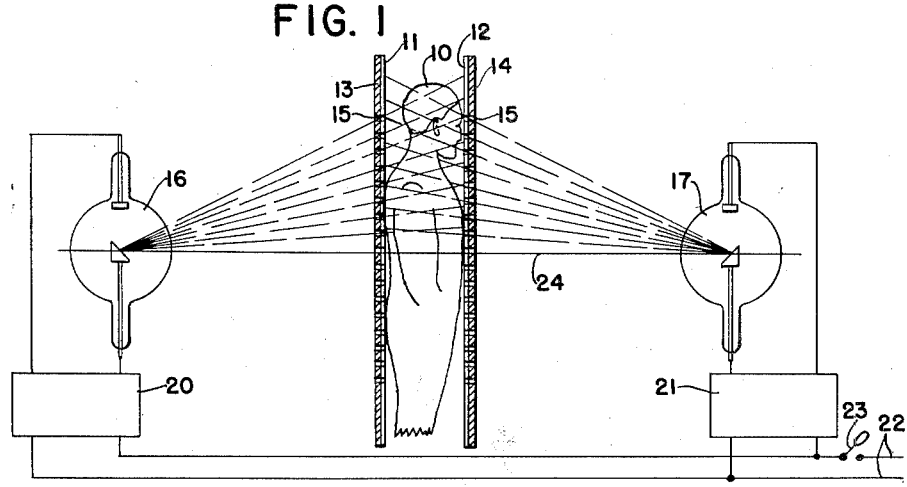
Fig. 1 is a schematic view of the system showing two X-ray tubes, two photographic films, and two metal shields secured to the films in close proximity to an opaque body.

Referring now to Fig. 1 an object 10 which is opaque to visible light is positioned between two photographic films 11 and 12. Secured to the back of each film is a metal plate 13 and 14 which is opaque to the penetrating radiation employed to affect the films 11 and 12. The metal shields 13 and 14 are preferably made of lead but any heavy metal such as iron or steel may be used. Each combination of steel plate and photographic film is formed with a plurality of small holes 15 to provide a path for the penetrating radiation which is generated on the shield side of the combination.

Two X-ray tubes 16 and 17 are positioned at equal distances from shields 13 and 14 and provide the penetrating radiation necessary for exposing the films 11 and 12. The X-ray tubes are each supplied with high voltage from transformer circuits 20 and 21, these circuits being shown in simplified block form since the details of this circuit do not form a part of the present invention. The transformer circuits receive their power from an electrical supply line 22, one conductor of which contains a series switch 23. Both transformer circuits are connected in parallel to this supply line so that the operation of switch 23 controls both X-ray tubes.

The method of using this arrangement comprises the simultaneous activation of both X-ray tubes during the exposure period. This period may be quite short and the exposure time is controlled only by the operation of the single switch 23. The penetrating radiation from tube 17 is incident upon the surface of shield 14, a considerable portion of the rays passing through holes 15, then through the body 10, and then striking the photographic film 11 and exposing it an amount which varies in proportion to the density of the body 10. The rays divert slightly after passing through holes 15 and the image on film 11 consists of a plurality of exposed circular areas which are slightly larger than the area of the holes 15.

Figure 3:
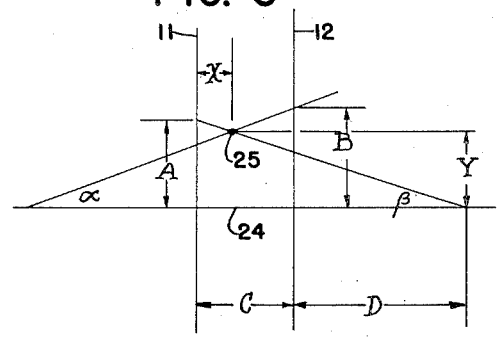
Fig. 3 is a geometrical diagram illustrating the method of computing the distances to a hidden object with respect to the films and a reference line.

After the exposure has been made the two films 11 and 12 are developed and fixed in the usual manner and the position of the desired hidden object is measured from the line 24 which joins the two sources. If these distances are equal it will be obvious that the object lies half way between the two plates. If the distances are different the position of the object may be calculated by two formulas which are derived from the geometrical construction as indicated in Fig. 3. In this figure an object 25 is located between plates 11 and 12, its coordinates being designated by X and Y. The position of the two images of the object on the two films are denoted by A and B, these distances being measured from a horizontal plane which passes through line 24. If the two plates are separated by distance C and if the sources 16 and 17 are a distance D from the plates then it can be shown that the distance X may be found by the following formula:

$$X = \frac{A(C+D) - BD}{A+B}$$

and in a similar manner the distance Y may be calculated by the following formula:

$$Y = \frac{AB(C+2D)}{(A+B)(C+D)}$$

Similar measurement and computation is necessary in order to determine the distance of the hidden object from the central vertical plane which passes through line 24.

Figure 2:
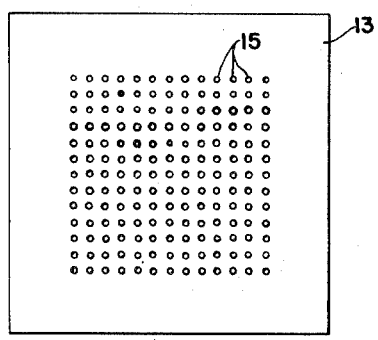
Fig. 2 is a detailed view of one of the photographic films showing a plurality of holes formed therein.
Figure 4:
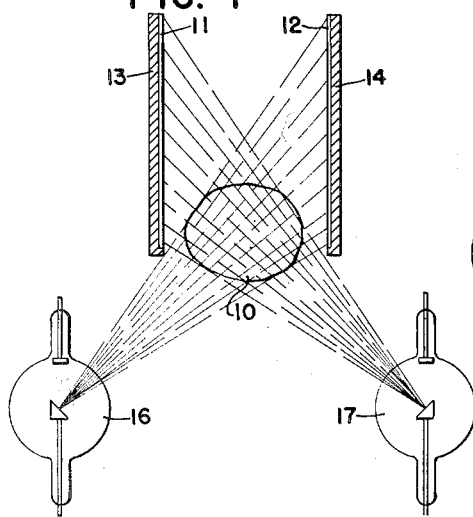
Fig. 4 is an alternate system of arranging the sources and the photographic films so that the same result may be accomplished without the use of the holes shown in Figs. 1 and 2.

The arrangement shown in Fig. 4 includes films 11 and 12 in contact with shields 13 and 14 and the sources of penetrating radiation 16 and 17 are placed in an off-center position so that all the rays which are generated by these two sources pass through the body 10 and form a complete picture on films 11 and 12 without the use of the series of holes as shown in Figs. 1 and 2. Since the films 11 and 12 are not in contact with the body the resulting picture may be lacking in some of the detail which is possible in pictures taken by the arrangement shown in Fig. 1. However, the method shown in Fig. 4 contemplates sources 16 and 17 which include active targets having a very small area. With proper precautions hidden objects in the body 10 can be located with a high degree of accuracy.

Figure 5:
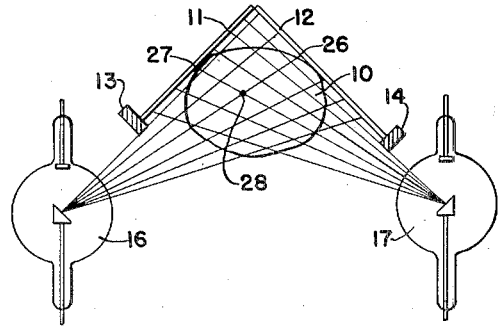
Fig. 5 illustrates another alternate arrangement of the two sources and the two films.

The arrangement shown in Fig. 5 includes photographic films 11 and 12 set at an angle to each other, the optimum value of which is approximately ninety degrees. Shields 13 and 14 are placed over the edges of the films and the sources 16 and 17 are placed at positions which lie in the plane of one film while being at a position which faces the other film. This arrangement produces sharp images since the films are in close proximity to the body 10 and in addition no holes are necessary in either the films or the shields. The calculation of the position of a hidden object is more difficult with this arrangement than with the arrangement shown in Fig. 1 and experience has shown that the best way to determine its position is to resort to a graphical method, making a drawing to a reduced scale and determining the position by intersecting lines. This method is illustrated in Fig. 5. Let it be assumed that one image of the object appears in film 12 at point 26 and that the same image appears in film 11 at point 27, it will then be obvious that the desired position is at point 28.

While it is obvious that simultaneous exposures produce the best results, power requirements may be such that only one X-ray tube can be exposed during any one time interval. If this is the case the two sources may be sequentially activated provided the time interval between their operation is short and no motion occurs during that time.

While there have been described and illustrated specific embodiments of the invention, it will be obvious that various changes and modifications can be made therein without departing from the field of the invention which should be limited only by the scope of the appended claims.

I claim:

1. A photographic system for locating objects within a body comprising; two sources of penetrating radiation positioned on opposite sides of the body; two photographic films also positioned on opposite sides of the body in close proximity thereto; and two metal shields which are opaque to said radiation, each adjacent to one of said films for shielding the film from the radiation from one of said sources, said shields containing a plurality of holes for the passage of said radiation.

2. A photographic system for locating hidden objects within a body which is opaque to visible light comprising; two sources of penetrating radiation positioned on opposite sides of the body; two photographic films which are affected by said penetrating radiation also positioned on opposite sides of the body in close proximity thereto; and two metal shields which are opaque to said radiation, each of which is mounted adjacent to one of said films for shielding portions of the film from the radiation of one of said sources, said shields containing a plurality of holes for the passage of said radiation.

3. A photographic system for locating hidden objects within a body which is opaque to visible light comprising; two sources of penetrating radiation positioned on opposite sides of the body; two photographic films which are affected by said penetrating radiation also positioned on opposite sides of the body in close proximity thereto; two metal shields which are opaque to said radiation, each of which is adjacent to one of said films for shielding portions of the film from the radiation from one of said sources; said shields containing a plurality of holes for the passage of said radiation; and controlling means for causing the simultaneous application of said radiation to the films.

4. A photographic system for locating hidden objects within a body which is opaque to visible light comprising, two sources of penetrating radiation positioned on opposite sides of the body, said sources supplied with electrical power from a supply line which includes a common switching means, two photographic films which are affected by said penetrating radiation also positioned on opposite sides of the body in close proximity thereto, two metal shields opaque to said radiation each in contact with one of said films for shielding the film from the radiation from one of said sources, said shields containing a plurality of holes for the passage of said radiation, and controlling means for causing the application of said radiation to the films.

5. A photographic system for locating hidden objects within a body which is opaque to visible light comprising, two sources of penetrating radiation positioned on opposite sides of the body, said sources supplied with electrical power from a supply line which includes a common switching means, two plane photographic films which are affected by said penetrating radiation also positioned on opposite sides of the body in close proximity thereto, two plane metal shields opaque to said radiation each in contact with one of said films for shielding the film from the radiation from one of said sources, each of said film and shield combinations containing a plurality of aligned holes for the passage of radiation from one of said sources to the other film, and controlling means for causing the application of said radiation to the films.

6. A system for locating hidden objects within a body which is opaque to visible light comprising; two spaced sources of penetrating radiation arranged to radiate parts of said body; an image recording means associated with each of said sources and positioned adjacent to the body; two metal shields opaque to said radiation each in contact with one of said image recording means, each of said shields containing a plurality of spaced holes for the passage of said radiation from one of said sources; and controlling means for causing the application of said radiation to the shields, the body, and the image recording means.

References Cited in the file of this patent

UNITED STATES PATENTS

| 2,276,137 | Young | Mar. 10, 1942 |
| 2,464,586 | Klein et al. | Mar. 15, 1949 |

FOREIGN PATENTS

| 308,050 | Italy | May 22, 1933 |
| 882,752 | Germany | July 13, 1953 |